United States Patent
Wakabayashi et al.

(10) Patent No.: US 6,222,031 B1
(45) Date of Patent: *Apr. 24, 2001

(54) PROCESS FOR PREPARING WATER-SOLUBLE TRICARBOXYPOLYSACCHARIDE

(75) Inventors: Hidechika Wakabayashi; Toru Takahashi; Masaru Sakamoto; Rieko Sano, all of Tokyo (JP)

(73) Assignee: Mitsubishi Gas Chemical Company, Inc., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/013,915

(22) Filed: Jan. 27, 1998

(30) Foreign Application Priority Data

Jan. 27, 1997 (JP) .................................................... 9-012523

(51) Int. Cl.$^7$ ........................................................ C07H 1/00
(52) U.S. Cl. ........................ 536/124; 536/105; 536/110; 536/119; 536/128
(58) Field of Search ..................................... 536/124, 105, 536/110, 128; 568/863

(56) References Cited

U.S. PATENT DOCUMENTS 6,008,345   12/1999   Dannoue et al. ..................... 536/124

FOREIGN PATENT DOCUMENTS

| 1401824 | 7/1975 | (GB) . |
| 9702293 | 1/1997 | (WO) . |
| 9702293 A1 * | 1/1997 | (WO) .............................. C08B/37/00 |

OTHER PUBLICATIONS

Rakovsky S. K. et al., "Carbohydrates ozonation, Selective cleavage of the 2.3 C–C bond in carbohydrates", vol. 19, No. 4, 1996, pp. 482–498.

* cited by examiner

*Primary Examiner*—James O. Wilson
*Assistant Examiner*—Howard Owens
(74) *Attorney, Agent, or Firm*—Antonelli, Terry, Stout & Kraus, LLP

(57) ABSTRACT

Disclosed is a process for preparing a water-soluble tricarboxypolysaccharide which includes the step of oxidizing an α-bonding type polysaccharide with a ruthenium compound and an oxidizing agent. The water-soluble tricarboxypolysaccharide, having a high carboxyl group content, can easily and inexpensively be prepared in a high yield without any problem of a post-treatment after the reaction, and thus the present invention is desirable as an industrial preparation process of the water-soluble tricarboxpolysaccharide.

6 Claims, No Drawings

PROCESS FOR PREPARING WATER-SOLUBLE TRICARBOXYPOLYSACCHARIDE

BACKGROUND OF THE INVENTION

1. Field of the Invention

The present invention relates to a process for oxidizing an α-bonding type polysaccharide, and more specifically, it relates to a process for preparing a water-soluble tricarboxypolysaccharide by oxidizing an α-bonding type polysaccharide with a high valence ruthenium oxide produced by the use of a ruthenium compound and an oxidizing agent. The water-soluble tricarboxypolysaccharide which can be obtained by the present invention can be utilized as any of a scale deposition inhibitor, a pigment dispersant, a sizing agent, a concrete blending agent, a detergent builder and the like.

2. Description of the Related Art

Heretofore, various methods for preparing a dicarboxypolysaccharide by oxidizing an α-bonding type polysaccharide are known. For example, in Japanese Patent Publication No. 1281/1974, there has been described a method for oxidizing an α-bonding type polysaccharide by the use of a combination of periodic acid and a chlorite, or a hypochlorite, and it has also been disclosed therein that a dicarboxystarch obtained by oxidizing the $C_2$ and $C_3$ positions of the α-bonding type polysaccharide is an excellent detergent builder.

Furthermore, Japanese Patent Application Laid-open No. 2187/1985 has described a process for preparing a dicarboxypolysaccharide from an α-bonding type polysaccharide in the presence of sodium hypochlorite, chlorine, or a combination of periodic acid and a halogen. In Japanese Patent Application Laid-open No. 175301/1992, a method for preparing a dicarboxypolysaccharide by the use of a hypochlorite and/or a hypoiodite has been disclosed.

On the other hand, with regard to a process for preparing a tricarboxypolysaccharide by oxidizing an α-bonding type polysaccharide, for example, Czechoslovakian Patent No. 235576 has described a method for preparing a tricarboxystarch from starch in the presence of a combination of a periodate and dinitrogen tetroxide. From EP-A-O 542496, there is known a process for preparing a tricarboxystarch from starch in the presence of a combination of a vanadium salt and a nitrite in a concentrated nitric acid-concentrated sulfuric acid solvent. Japanese Patent Application Laid-open No. 71601/1997 has described a process for preparing a polycarboxylic acid derived from a polysaccharide having anhydrous glucose as a constitutional unit.

However, in Czechoslovakian Patent No. 235576 mentioned above, a long process of two steps is required, and the oxidizing agent which is expensive and is available through a complicated route must be used. In addition, the obtained tricarboxystarch is not water-soluble, which is inconvenient for its use. Moreover, in the process described in EP-A-O 542496, a post-treatment of the mixed acids having the high concentrations which is to be done after reaction is not easy, and another problem such as the removal/disposal of the used metal salt are also present. For these reasons, the disclosed process is not desirable as an industrial manufacturing technique. Furthermore, these methods described above are insufficient to easily and inexpensively manufacture a water-soluble tricarboxypolysaccharide having a high carboxyl group content in a high yield which is intended by the present invention. Additionally, even by the process disclosed in Japanese Patent Application Laid-open No. 71601/1997, sufficiently satisfactory results have not been obtained so far.

SUMMARY OF THE INVENTION

The present invention has been developed to solve the above-mentioned problems of the conventional techniques, and an object of the present invention is to provide an industrial process for easily and inexpensively preparing a conveniently usable water-soluble tricarboxypolysaccharide having a high carboxyl group content in a high yield without any problem of a post-treatment after a reaction.

The present inventors have investigated on a process for preparing a water-soluble tricarboxypolysaccharide from an α-bonding type polysaccharide as a raw material, and as a result, the present invention has now been completed.

That is to say, the present invention is directed to a process for easily and inexpensively preparing a conveniently usable water-soluble tricarboxypolysaccharide having a high carboxyl group content in a high yield without any problem of a post-treatment after a reaction which comprises the step of oxidizing an α-bonding type polysaccharide, in an aqueous solvent or a mixed solvent stable to water and an oxidizing agent, in the presence of a high valence ruthenium oxide produced from a catalytic amount of a ruthenium compound with an oxidizing agent.

DETAILED DESCRIPTION OF THE INVENTION

A water-soluble tricarboxypolysaccharide referred to in the present invention means a water-soluble tricarboxypolysaccharide in which the $C_2$ and $C_3$ positions of a saccharic pyranose ring constituting an α-bonding type polysaccharide are cleaved and 10 mol % or more of secondary alcohols at the $C_2$ and $C_3$ positions and 10 mol % or more of a primary alcohol at the $C_6$ position are simultaneously oxidized into carboxyl groups, or a water-soluble tricarboxypolysaccharide in which 10 mol % or more of secondary alcohols at the $C_2$ and $C_3$ positions is oxidized into carboxyl groups and 10 mol % or more of an ester at the $C_6$ position is simultaneously hydrolyzed, or a mixture thereof.

A raw material which can be used in the present invention is the α-bonding type polysaccharide, and typical examples of the α-bonding type polysaccharide include starch, amylose, amylopectin, pectin, protopectin and pectinic acid. Examples of the starch include corn starch, potato starch, tapioca starch, wheat starch, sweet potato starch and rice starch, and above all, corn starch, potato starch and tapioca starch are particularly preferable. Furthermore, a water-soluble starch obtained by decreasing the molecular weight of any of these starches is also preferable. The above-mentioned raw material can be used at a concentration in the range of 1 to 80% by weight, preferably 5 to 50% by weight.

A high valence ruthenium oxide which can be used in the present invention means a ruthenium oxide in which a ruthenium atom has a valence of +6, +7 or +8. This high valence ruthenium oxide can be produced by the use of a ruthenium compound and an oxidizing agent. Examples of the ruthenium compound which can be used in the present invention include ruthenium metal and various kinds of ruthenium compounds. Typical examples of the ruthenium compounds include ruthenium oxides such as ruthenium dioxide and ruthenium tetroxide; ruthenium hydroxide; ruthenium sulfate; ruthenium halides such as ruthenium chloride and ruthenium bromide; and ruthenium complexes such as ruthenium dodecacarbonium.

In addition, a ruthenium metal supporting material obtained by supporting the ruthenium metal on any of various carriers can also be used. Typical examples of the ruthenium metal supporting material include ruthenium metal-alumina, ruthenium metal-carbon, ruthenium metal-silica-alumina and ruthenium metal-titania. The amount of the ruthenium compound to be used is a catalytic amount in the range of 0.00001 to 1 mol, preferably 0.0001 to 0.1 mol per mol of the α-bonding type polysaccharide which is the raw material. Here, 1 mol of the α-bonding type polysaccharide as the raw material means the number of mols of a glucopyranose unit or a methyl galacturonate ester pyranose unit.

Examples of the oxidizing agent for the ruthenium compound which can be used in the present invention include halogens, halogenic acids and their salts, oxygen, ozone, peracids, hydrogen peroxide, persulfuric acid and its salts, and ferricyanides. Typical examples of the oxidizing agent include halogen molecules such as chlorine and bromine; halogen oxides such as dichlorine monoxide, chlorine dioxide, dibromine monoxide and bromine dioxide; perhalogenic acids such as periodic acid and perchloric acid as well as their salts; halogenic acids such as bromic acid and chloric acid; halogenous acids such as bromonous acid and chlorous acid as well as their salts; hypohalogenous acids such as hypobromous acid and hypochlorous acid as well as their salts; oxygen; ozone; peracids such as performic acid, peracetic acid and perbenzoic acid; hydroperoxides such as cumene hydroperoxide and benzyl hydroperoxide; peroxides such as tert-butylbenzyl oxide and dibenzoyl peroxide; a persulfuric acid such as peroxydisulfuric acid and its salts; Caro's acid; and ferricyanides such as sodium ferricyanide and potassium ferricyanide.

Among these oxidizing agents, ozone, the water-soluble halogenic acids and their salts are particularly preferable. Moreover, the amount of the oxidizing agent to be used is in the range of 0.5 mol to 10 mol, preferably 0.9 mol to 8 mol per mol of the raw material.

Ozone which can be used in the present invention can be obtained by a method in which voiceless discharge is carried out in a clean dry air or oxygen (an ozonizer), a method in which air or oxygen is irradiated with ultraviolet light, a method in which dilute sulfuric acid is electrolyzed at a low temperature, or a chemical method which comprises a reaction between fluorine and water or the oxidation of phosphoric acid. Among these methods, the method using the ozonizer is most preferable as an industrial technique, because according to this method, a large amount of ozone can efficiently and easily be obtained. Nowadays, ozone produced by this method has been used as a germicide for clean drinking water and a waste water treating agent on a large scale.

The generation rate of ozone depends on reaction conditions, but usually, it is in the range of 0.001 to 100 mol/min, preferably 0.01 to 10 mol/min per mol of the selected ruthenium compound.

As a reaction solvent for use in the present invention, an aqueous solvent or a mixed solvent stable to water and an oxidizing agent can usually be used. Typical examples of the solvent stable to the oxidizing agent include organic acids such as acetic acid; halogenated hydrocarbons such as carbon tetrachloride, chloroform and dichloromethane; methane series saturated hydrocarbons such as pentane and hexane; and cycloparaffin series hydrocarbons such as cyclohexane. Among these solvents, the organic acids, the halogenated hydrocarbons and the paraffin series solvents are particularly preferable. Furthermore, in the case of the mixed solvent which is incompatible with water, stirring can sufficiently be made to accelerate a reaction rate.

The water-soluble tricarboxypolysaccharide which can be obtained by the present invention has a polymer structure in which the $C_2$ and $C_3$ positions of a saccharic pyranose ring constituting the α-bonding type polysaccharide are cleaved, and 10 mol % or more of secondary alcohols at the $C_2$ and $C_3$ positions and 10 mol % or more of a primary alcohol at the $C_6$ position are simultaneously oxidized into carboxyl groups, so that three kinds of carboxyl groups hang from many chains, or a polymer structure in which 10 mol % or more of secondary alcohols at the $C_2$ and $C_3$ positions is oxidized into carboxyl groups and 10 mol % or more of an ester at the $C_6$ position is simultaneously hydrolyzed, so that three kinds of many carboxyl groups bond to chains. The molecular weight of this tricarboxypolysaccharide is usually in the range of 1,000 to 100,000 in terms of the weight-average molecular weight of polysaccharides as samples when measured by GPC.

In the present invention, the water-soluble tricarboxypolysaccharide which is the desired product can be obtained in the state of an aqueous solution. This aqueous solution, if necessary, can be desalted and concentrated by an ion exchange membrane dialysis or a reverse osmosis membrane dialysis, and then utilized as a scale inhibitor, a pigment dispersant, a sizing agent, a concrete blending agent, a detergent builder or the like. Alternatively, a lower alcohol or a lower ketone can be added to the aqueous solution of the tricarboxypolysaccharide obtained by the reaction, whereby the water-soluble product can be obtained in the form of a precipitated solid.

In the present invention, a reaction is usually carried out at a reaction temperature of 0 to 100° C., preferably 5 to 50° C. at a reaction solution pH of 1 to 9, preferably 7 or less, more preferably less than 6, while the oxidizing agent is slowly added with stirring to a mixture of the raw material, the catalytic amount of the ruthenium compound and the aqueous solvent or the mixed solvent stable to water and the oxidizing agent to produce the catalytic amount of the high valence ruthenium oxide. Alternatively, the high valence ruthenium oxide produced from the ruthenium compound in the presence of the oxidizing agent may be added to the raw material and the reaction solvent to carry out the reaction. A time required for the reaction depends on reaction conditions such as the reaction temperature, the pH of the reaction solution and the amount of the oxidizing agent to be used.

According to the present invention, a conveniently usable water-soluble tricarboxypolysaccharide having a high carboxyl group content can easily and inexpensively be prepared from an a-bonding type polysaccharide in a high yield without any problem of a post-treatment after the reaction, and hence the present invention is desirable as the industrial preparation process of the water-soluble tricarboxypolysaccharide.

Next, the present invention will be described in more detail in accordance with examples, but the scope of the present invention should not be limited by these examples. In the examples, a molecular weight was measured in terms of the weight-average molecular weight of polysaccharides as samples by GPC (column: Shodex OHpack SBG/Shodex OHpack SB-803HQ 8 mm ID×300 mm L, RI detector) in which aqueous solutions of 0.3 M NaCl, 0.1 M $NaH_2PO_4$ and 0.33 M $KH_2PO_4$ were used as eluents. For the structure analysis of a product, $^{13}CNMR$ and IR were used. As an ozonizer, Ozonizer-SG-01A (made by Sumitomo Precision Products Co., Ltd.) was used.

EXAMPLE 1

In a 300 ml round pyrex flask equipped with a stirrer, a thermometer, a condenser and a burette were placed 50 ml of water, 2 g of corn starch (made by Shikishima Starch Co., Ltd.) and 20 mg of ruthenium oxide, and they were then cooled to a temperature of 2 to 6° C. with stirring. To this mixture, a 6.7% sodium hypochlorite solution was slowly added. Immediately when the sodium hypochlorite solution was added, the color of the reaction solution changed from black to yellow, and with the progress of the reaction, it returned to black again. This operation was repeated until the yellow of the reaction solution did not change for 30 minutes or more. The pH of the reaction solution was in the range of 1 to 2. A reaction time was 5 hours. After completion of the reaction, a yellow component of ruthenium tetroxide which was a high valence ruthenium oxide was extracted three times with 100 ml of carbon tetrachloride to remove the yellow component. After the extraction, the pH of the reaction solution was regulated so as to be in the range of 7 to 8, and 200 ml of methanol was then added thereto, thereby obtaining a white precipitate. This operation was repeated twice, and the resulting white precipitate was then dried in a vacuum at 60° C. for 5 hours to obtain 2.1 g of a dry solid. The structure analysis of this dry solid was carried out by $^{13}$CNMR and IR, and as a result, it was confirmed that a tricarboxystarch was produced in which 64 mol % of a primary alcohol at the $C_6$ position of a glucopyranose structure of the raw material corn starch was oxidized into a carboxyl group and simultaneously the $C_2$ and $C_3$ positions were cleaved, and 62 mol % of secondary alcohols at the $C_2$ and $C_3$ positions was oxidized into carboxyl groups.

The thus obtained tricarboxystarch was dissolved in water, and then converted into an acid type by the use of an H type ion exchange resin. Afterward, the solution was titrated with a 1/20 N sodium hydroxide solution, and as a result, the content of the carboxyl groups was 8.1 meq/g. In addition, the weight-average molecular weight of the tricarboxystarch measured by GPC was 4,000.

EXAMPLE 2

The same procedure as in Example 1 was conducted except that such a similar reactor as in Example 1 which was equipped with a pH meter was used and a reaction was carried out, maintaining a pH of a reaction solution at 3. A reaction time was 7 hours. After the reaction, all the same treatment as in Example 1 was carried out to obtain 2.1 g of a dry solid. The structure analysis of this dry solid was done by $^{13}$CNMR and IR, and as a result, it was confirmed that a tricarboxystarch was produced in which 100 mol % of a primary alcohol at the $C_6$ position of the raw material corn starch was oxidized into a carboxyl group and simultaneously the $C_2$ and $C_3$ positions were cleaved, and 65 mol % of secondary alcohols at the $C_2$ and $C_3$ positions was oxidized into carboxyl groups.

Furthermore, the carboxyl group content of the tricarboxystarch was measured in the same manner as in Example 1. As a result, the content of the carboxyl groups was 8.8 meq/g. In addition, the weight-average molecular weight of the tricarboxystarch measured by GPC was 4,300.

EXAMPLE 3

A reaction and a post-treatment were carried out by the same procedure as in Example 1 except that the reaction was carried out, maintaining a pH of a reaction solution at 9, to obtain 0.9 g of a dry solid. A reaction time was 4 hours. The structure analysis of the obtained dry solid was done by $^{13}$CNMR and IR, and as a result, it was confirmed that a tricarboxystarch was produced in which 10 mol % of a primary alcohol at the $C_6$ position of the raw material corn starch was oxidized into a carboxyl group and simultaneously the $C_2$ and $C_3$ positions were cleaved, and 15 mol % of secondary alcohols at the $C_2$ and $C_3$ positions was oxidized into carboxyl groups.

Furthermore, the carboxyl group content of the tricarboxystarch was measured in the same manner as in Example 1.

As a result, the content of the carboxyl groups was 2.2 meq/g. In addition, the weight-average molecular weight of the tricarboxystarch measured by GPC was 17,000.

EXAMPLE 4

A reaction and a post-treatment were carried out at pH 3 by the same procedure as in Example 1 except that a soluble starch (made by Merck) was used as a raw material for the reaction and ruthenium trichloride was used as a ruthenium compound, thereby obtaining 2.5 g of a dry solid. A reaction time was 5 hours. The structure analysis of the resulting dry solid was done by $^{13}$CNMR and IR, and as a result, it was confirmed that a tricarboxystarch was produced in which 100 mol % of a primary alcohol at the $C_6$ position of the soluble starch as the raw material was oxidized into a carboxyl group and simultaneously the $C_2$ and $C_3$ positions were cleaved, and 55 mol % of secondary alcohols at the $C_2$ and $C_3$ positions was oxidized into carboxyl groups.

Furthermore, the carboxyl group content of the tricarboxystarch was measured in the same manner as in Example 1. As a result, the content of the carboxyl groups was 8.7 meq/g. In addition, the weight-average molecular weight of the tricarboxystarch measured by GPC was 4,600.

EXAMPLE 5

A reaction and a post-treatment were carried out by the same procedure as in Example 1 except that pectin was used as a raw material for the reaction and ruthenium sulfate and peracetic acid were used as a ruthenium compound and an oxidizing agent, respectively, thereby obtaining 0.9 g of a dry solid. A reaction time was 6 hours. The structure analysis of the resulting dry solid was done by $^{13}$CNMR and IR, and as a result, it was confirmed that a tricarboxypectin was produced in which 100 mol % of a methyl ester group at the $C_6$ position of a methyl galacturonate ester pyranose structure of the raw material pectin was hydrolyzed and simultaneously the $C_2$ and $C_3$ positions were cleaved, and 35 mol % of secondary alcohols at the $C_2$ and $C_3$ positions was oxidized into carboxyl groups.

Furthermore, the carboxyl group content of the tricarboxypectin was measured in the same manner as in Example 1. As a result, the content of the carboxyl groups was 7.6 meq/g. In addition, the weight-average molecular weight of the tricarboxypectin measured by GPC was 4,300.

EXAMPLE 6

In a 500 ml round pyrex flask equipped with a stirrer, a thermometer, a pH meter and a condenser were placed 300 ml of water, 3 g of corn starch and 30 mg of ruthenium dioxide, and while they were stirred at room temperature (about 20° C.), ozone gas generated from oxygen at a rate of 0.12 g (2.5 mmol)/min by an ozonizer was introduced into the solution. The pH of the solution immediately before the gas introduction was 5.5, and a reaction was continued until the pH did not change any more. A reaction time was 3 hours and 30 minutes, and after completion of the reaction, the pH was 2.1. After the completion of the reaction, a yellow component of ruthenium tetroxide which was a high valence ruthenium oxide was extracted three times with 200 ml of carbon tetrachloride to remove the yellow component. After the extraction, the pH of the reaction solution was regulated to 7 with 1 N sodium hydroxide, followed by drying under reduced pressure in an evaporator. Vacuum drying was further performed at 60° C. for 5 hours to obtain 2.8 g of a dry solid. The structure analysis of this dry solid was carried out by $^{13}$CNMR and IR, and as a result, it was confirmed that a tricarboxystarch was produced in which 30 mol % of a primary alcohol at the $C_6$ position of a glucopyranose structure of the raw material corn starch was oxidized into a carboxyl group and simultaneously the $C_2$ and $C_3$ positions were cleaved, and 40 mol % of secondary alcohols at the $C_2$ and $C_3$ positions was oxidized into carboxyl groups.

The thus obtained tricarboxystarch was dissolved in water, and then converted into an acid type by the use of an H type ion exchange resin. Afterward, the solution was titrated with a 1/20 N sodium hydroxide solution, and as a result, the content of the carboxyl groups was 5.4 meq/g. In addition, the weight-average molecular weight of the tricarboxystarch measured by GPC was 3,500.

EXAMPLE 7

The same procedure as in Example 6 was conducted except that such a similar reactor as in Example 6 was used and a reaction was carried out, maintaining a pH of a reaction solution at 4. A reaction time was 2 hours. After the reaction, all the same treatment as in Example 6 was carried out to obtain 2.4 g of a dry solid. The structure analysis of this dry solid was done by $^{13}CNMR$ and IR, and as a result, it was confirmed that a tricarboxystarch was produced in which 40 mol % of a primary alcohol at the $C_6$ position of the raw material corn starch was oxidized into a carboxyl group and simultaneously the $C_2$ and $C_3$ positions were cleaved, and 55 mol % of secondary alcohols at the $C_2$ and $C_3$ positions was oxidized into carboxyl groups.

Furthermore, the carboxyl group content of the tricarboxystarch was measured in the same manner as in Example 6. As a result, the content of the carboxyl groups was 6.9 meq/g. In addition, the weight-average molecular weight of the tricarboxystarch measured by GPC was 3,300.

EXAMPLE 8

A reaction and a post-treatment were carried out by the same procedure as in Example 6 except that the reaction was carried out, maintaining a pH of a reaction solution at 9, to obtain 1.9 g of a dry solid. The structure analysis of the thus obtained dry solid was done by $^{13}CNMR$ and IR, and as a result, it was confirmed that a tricarboxystarch was produced in which 10 mol % of a primary alcohol at the $C_6$ position of the raw material corn starch was oxidized into a carboxyl group and simultaneously the $C_2$ and $C_3$ positions were cleaved, and 20 mol % of secondary alcohols at the $C_2$ and $C_3$ positions was oxidized into carboxyl groups.

Furthermore, the carboxyl group content of the tricarboxystarch was measured in the same manner as in Example 6. As a result, the content of the carboxyl groups was 2.8 meq/g. In addition, the weight-average molecular weight of the tricarboxystarch measured by GPC was 12,000.

EXAMPLE 9

A reaction was carried out by the same procedure as in Example 6 except that a soluble starch was used as a raw material for the reaction and ruthenium trichloride was used as a ruthenium compound. A reaction time was 3 hours and 40 minutes. After the reaction, all the same treatment as in Example 6 was conducted to obtain 2.8 g of a dry solid. The structure analysis of this dry solid was done by $^{13}CNMR$ and IR, and as a result, it was confirmed that a tricarboxystarch was produced in which 35 mol % of a primary alcohol at the $C_6$ position of the raw material corn starch was oxidized into a carboxyl group and simultaneously the $C_2$ and $C_3$ positions were cleaved, and 43 mol % of secondary alcohols at the $C_2$ and $C_3$ positions was oxidized into carboxyl groups.

Furthermore, the carboxyl group content of the tricarboxystarch was measured in the same manner as in Example 6. As a result, the content of the carboxyl groups was 5.8 meq/g. In addition, the weight-average molecular weight of the tricarboxystarch measured by GPC was 3,800.

EXAMPLE 10

A reaction and a post-treatment were carried out by the same procedure as in Example 6 except that pectin was used as a raw material for the reaction, thereby obtaining 1.5 g of a dry solid. The structure analysis of the thus obtained dry solid was done by $^{13}CNMR$ and IR, and as a result, it was confirmed that a tricarboxypectin was produced in which 30 mol % of a methyl ester group at the $C_6$ position of a methyl galacturonate ester pyranose structure of the raw material pectin was hydrolyzed and simultaneously the $C_2$ and $C_3$ positions were cleaved, and 35 mol % of secondary alcohols at the $C_2$ and $C_3$ positions was oxidized into carboxyl groups.

Furthermore, the carboxyl group content of the tricarboxypectin was measured in the same manner as in Example 6. As a result, the content of the carboxyl groups was 5.0 meq/g. In addition, the weight-average molecular weight of the tricarboxypectin measured by GPC was 3,300.

Comparative Example 2

The same reaction as in Example 6 was carried out except that ruthenium dioxide was not used. After completion of the reaction, all the same treatment as in Example 6 was conducted, and the structure analysis of the resulting dry solid was done by $^{13}CNMR$ and IR. However, the production of a tricarboxystarch could not be confirmed.

What is claimed is:

1. A process for preparing a water-soluble tricarboxypolysaccharide by oxidizing an α-bonding type polysaccharide with a high valence ruthenium oxide, which comprises the steps of:
    mixing the α-bonding type polysaccharide and a ruthenium compound in a solvent forming a resultant mixture; and adding an oxidizing agent to the resultant mixture to oxidize the ruthenium compound to the high valence ruthenium oxide, thereby to promote the oxidation reaction of the α-bonding type polysaccharide, by the high valence ruthenium oxide to the water-soluble tricarboxypolysaccharide, the oxidation reaction of the α-bonding type polysaccharide taking place in a temperature range of 0°–100° C. and a pH range of 1 to 3, the oxidizing agent being a hypohalogenous acid or salt thereof.

2. The process according to claim 1, wherein the α-bonding type polysaccharide is starch, amylose, amylopectin, pectin, protopectin or pectinic acid.

3. The process according to claim 1, wherein the ruthenium compound is ruthenium metal, a ruthenium metal-carrier, ruthenium dioxide, a ruthenium trihalide, ruthenium sulfate or a ruthenium complex.

4. The process according to claim 1, wherein the high valence ruthenium oxide is ruthenium tetroxide.

5. The process according to claim 1, wherein the hypohalogenous acid is hypochlorous acid.

6. The process according to claim 1, wherein the oxidizing agent is added to the resultant mixture slowly, with stirring.

* * * * *